(12) United States Patent
Huang et al.

(10) Patent No.: US 6,982,409 B2
(45) Date of Patent: Jan. 3, 2006

(54) MEASUREMENT SYSTEM FOR BALL JOINT OF CRASH TEST DUMMY

(75) Inventors: Yue Huang, Novi, MI (US); Eric J. Stanley, Wayne, MI (US); Ali M. Elhagediab, Dearborn, MI (US)

(73) Assignee: First Technology Safety Systems, Inc., Plymouth, MI (US)

( * ) Notice: Subject to any disclaimer, the term of this patent is extended or adjusted under 35 U.S.C. 154(b) by 239 days.

(21) Appl. No.: 10/371,442

(22) Filed: Feb. 21, 2003

(65) Prior Publication Data

US 2004/0099825 A1    May 27, 2004

Related U.S. Application Data

(60) Provisional application No. 60/358,470, filed on Feb. 21, 2002.

(51) Int. Cl.
*G06M 7/00*    (2006.01)
(52) U.S. Cl. .................... 250/221; 73/866.4
(58) Field of Classification Search ............. 250/221; 73/866.4; 434/274
See application file for complete search history.

(56) References Cited

U.S. PATENT DOCUMENTS

| | | | |
|---|---|---|---|
| 4,261,113 A | 4/1981 | Alderson | 434/274 |
| 4,349,339 A | 9/1982 | Daniel | 434/274 |
| 4,409,835 A | 10/1983 | Daniel et al. | 73/866.4 |
| 4,488,433 A | 12/1984 | Denton et al. | 73/866.4 |
| 4,701,132 A | 10/1987 | Groesch et al. | 434/274 |
| 4,873,867 A | 10/1989 | McPherson et al. | 73/493 |
| 5,526,707 A | 6/1996 | Smrcka | 73/866.4 |
| 5,528,943 A | 6/1996 | Smrcka et al. | 73/866.4 |
| 5,589,651 A | 12/1996 | Viano et al. | 73/866.4 |
| 5,655,922 A | 8/1997 | Dux et al. | 439/213 |
| 5,741,989 A | 4/1998 | Viano et al. | 73/866.4 |
| 6,206,703 B1 | 3/2001 | O'Bannon | 434/274 |
| 6,220,089 B1 | 4/2001 | Gu et al. | 73/172 |
| 6,439,070 B1 | 8/2002 | Beebe et al. | 73/866.4 |

FOREIGN PATENT DOCUMENTS

DE          3830520 A1 *  3/1990

* cited by examiner

*Primary Examiner*—Thanh X. Luu

(74) *Attorney, Agent, or Firm*—Bliss McGlynn, P.C.

(57)    ABSTRACT

A measurement system is provided for a ball joint of a crash test dummy. The measurement system includes a light source operatively supported by a movable ball of the ball joint and a position sensitive detector operatively supported by a fixed member of the ball joint. The measurement system also includes a controller electrically connected to the light source to provide power to the light source for emitting light and electrically connected to the position sensitive detector that receives the emitted light to measure at least two angles between the ball and the fixed member.

20 Claims, 5 Drawing Sheets

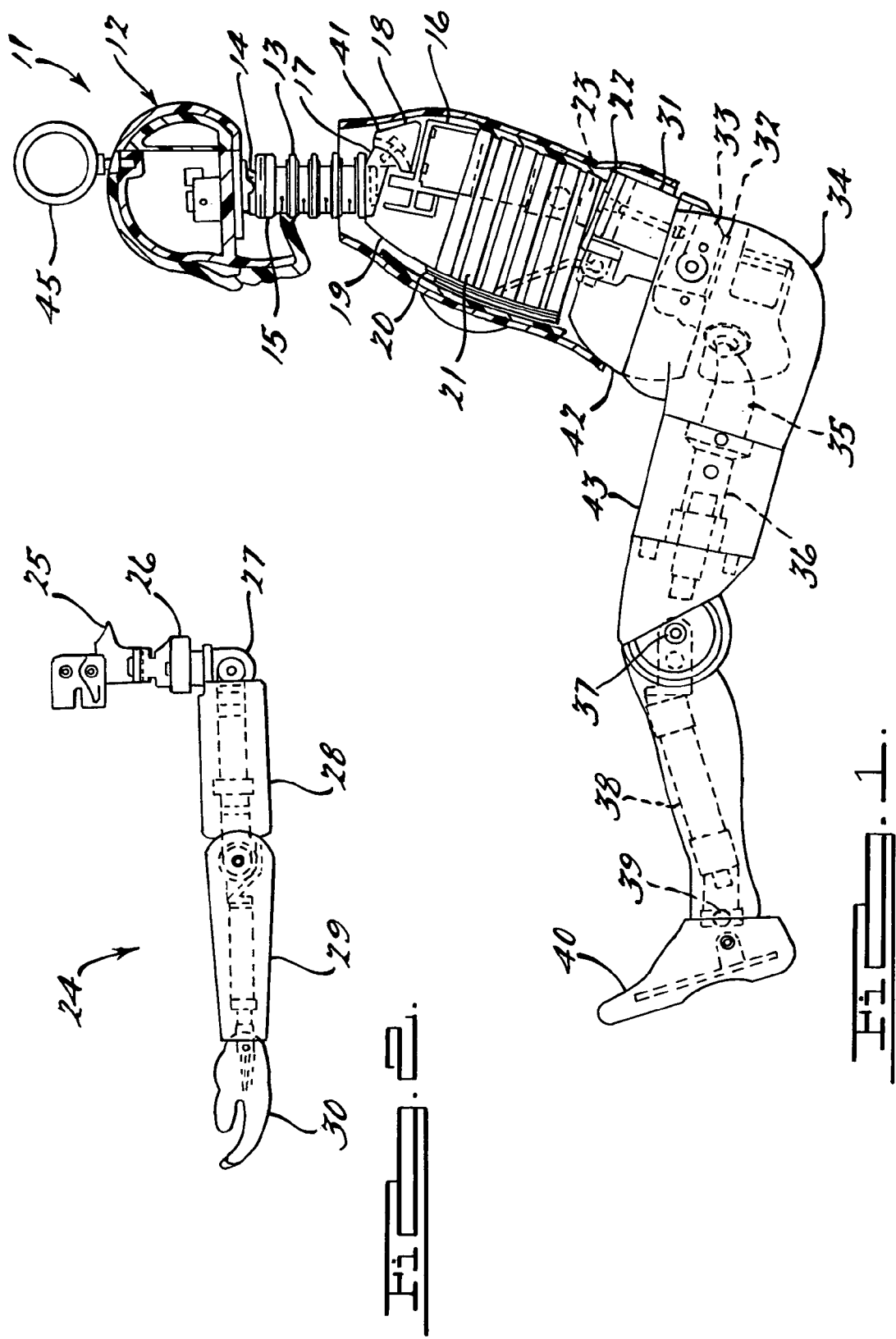

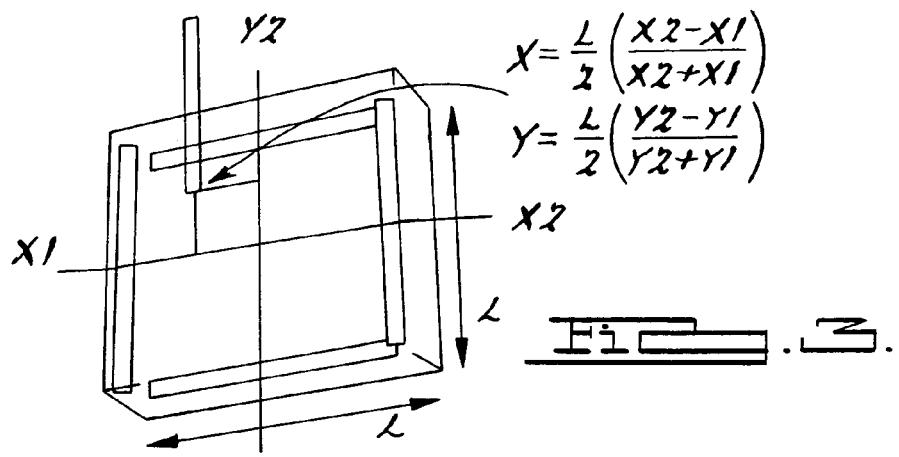
FIG. 3.
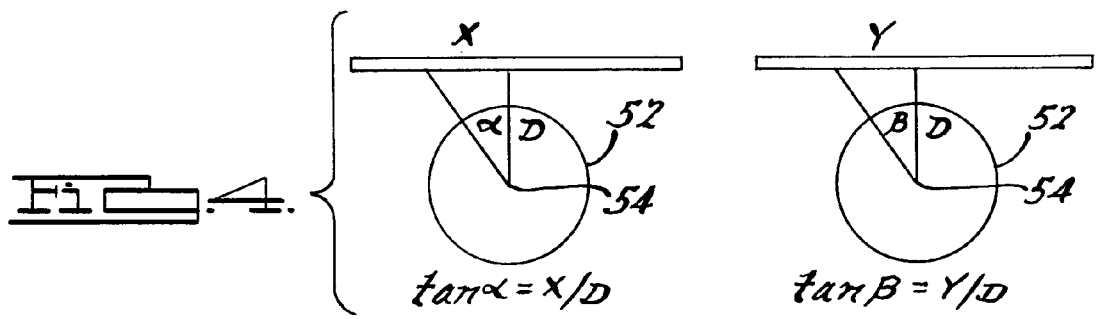
FIG. 4.
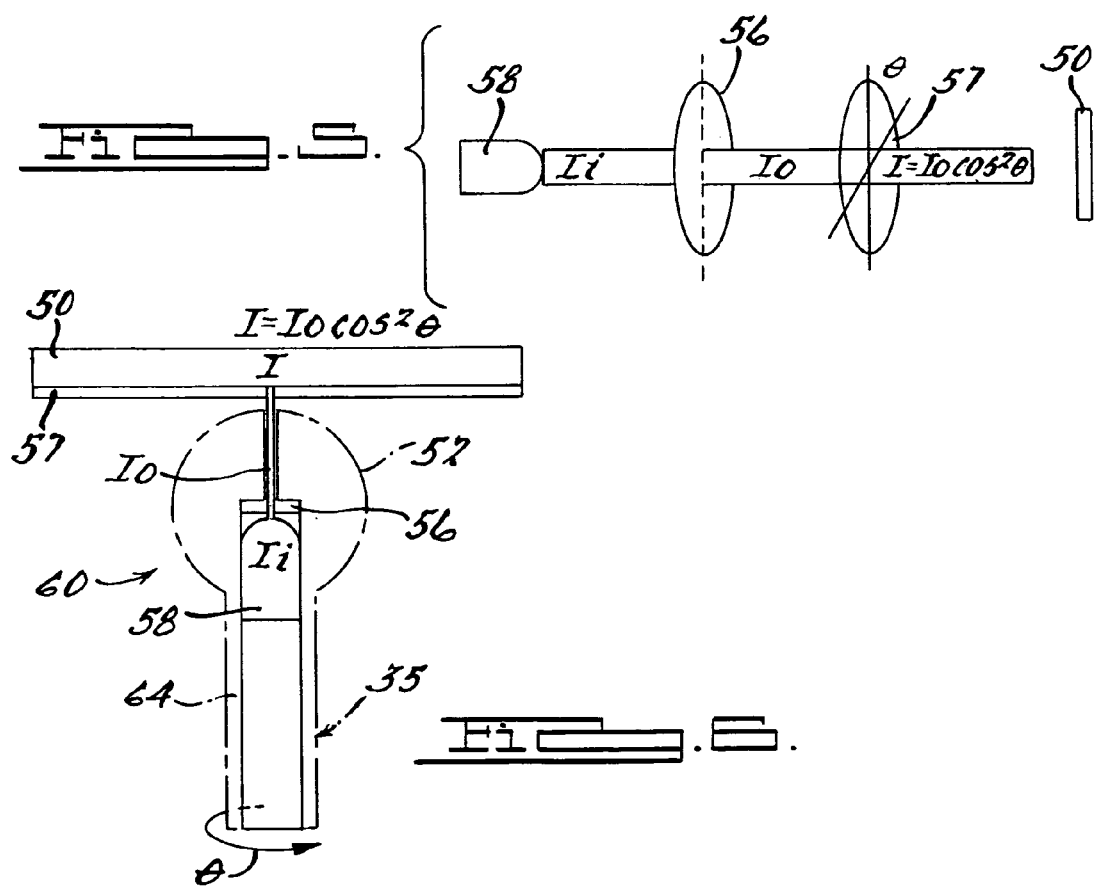
FIG. 5.
FIG. 6.

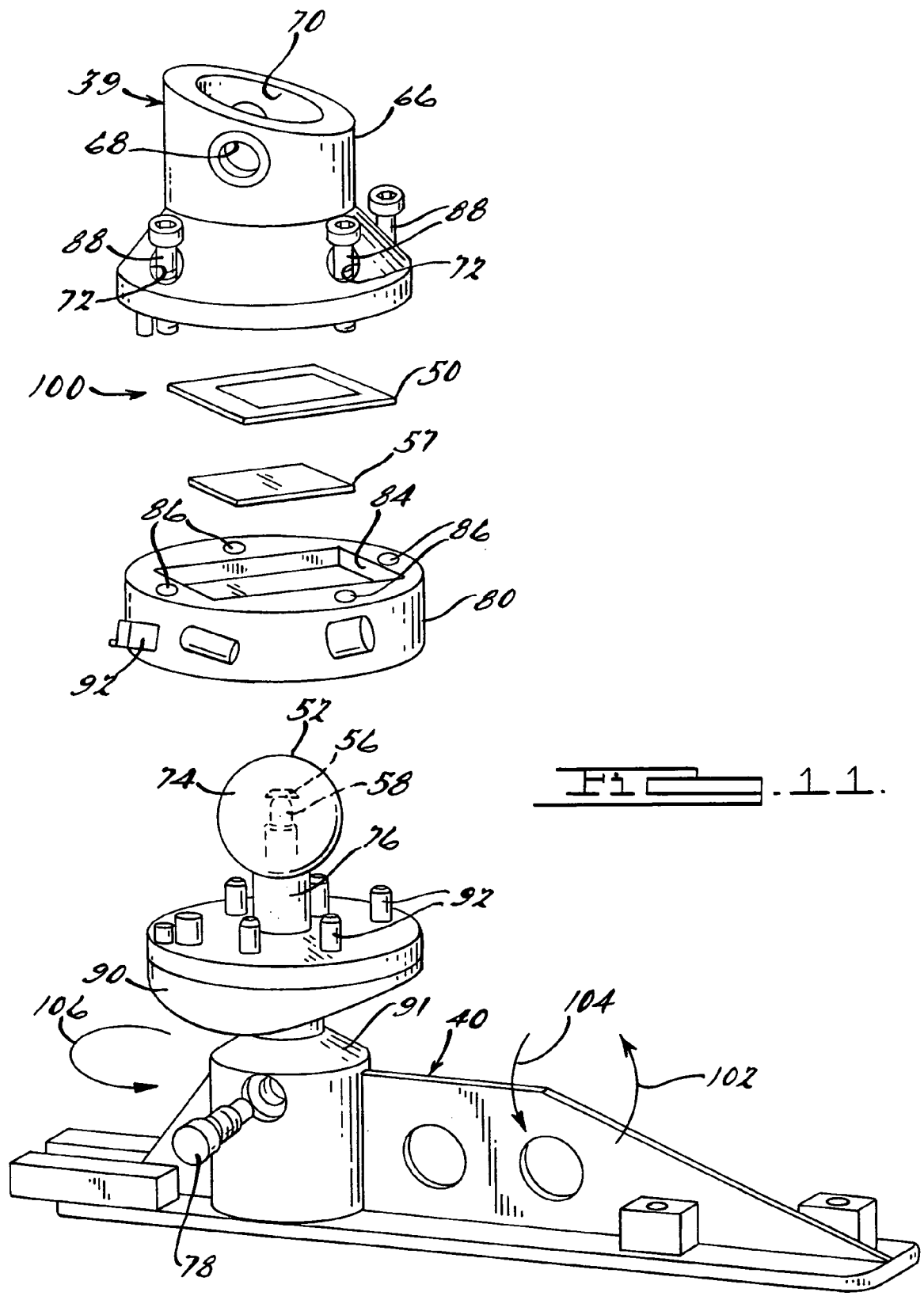

MEASUREMENT SYSTEM FOR BALL JOINT OF CRASH TEST DUMMY

CROSS-REFERENCE TO RELATED APPLICATION(S)

The present invention claims the priority date of copending U.S. Provisional Patent Application Ser. No. 60/358,470, filed Feb. 21, 2002.

BACKGROUND OF THE INVENTION

1. Field of the Invention

The present invention relates generally to measurement systems for crash test dummies and, more specifically, to a hip joint measurement system and ankle joint measurement system for a crash test dummy.

2. Description of the Related Art

It is known to provide a crash test dummy for evaluating occupant performance and occupant restraint system performance in an impact of a vehicle such as an automotive vehicle. The crash test dummy may resemble a $50^{th}$ percentile male and typically includes a head, torso, arms, and legs. The crash test dummy also typically includes shoulder, elbow, and wrist joints. The crash test dummy further typically includes hip, knee, and ankle joints.

It is found that the crash test dummy does not have the measurement capabilities at the shoulder, elbow, wrist, hip, knee, and ankle joints to capture the 3-D kinematics of the crash test dummy. As a result, it is desirable to provide a measurement system to collect data from these regions of the crash test dummy.

It is known that ball joint rotation can be measured in a number of ways, for example, using a computer mouse and joystick. However, none of these devices and methods provides sufficient accuracy, speed, and dynamic response in a crash test environment and the size of that instrumentation cannot be packaged inside a hip joint or ankle joint without compromising performance. As a result, there is a need in the art to provide a hip joint measurement system and ankle joint measurement system for a crash test dummy.

SUMMARY OF THE INVENTION

Accordingly, the present invention is a measurement system for a ball joint of a crash test dummy. The measurement system includes a light source operatively supported by a movable ball of the ball joint and a position sensitive detector operatively supported by a fixed member of the ball joint. The measurement system also includes a controller electrically connected to the light source to provide power to the light source for emitting light and electrically connected to the position sensitive detector that receives the emitted light to measure at least two angles between the ball and the fixed member.

One advantage of the present invention is that a hip joint measurement system is provided for a crash test dummy to collect data from this region of the crash test dummy. Another advantage of the present invention is that an ankle joint measurement system is provided for a crash test dummy to collect data from this region of the crash test dummy. Yet another advantage of the present invention is that the hip joint measurement system and ankle joint measurement system provide sufficient accuracy, speed, and dynamic response in a crash test environment. Still another advantage of the present invention is that the hip joint measurement system and ankle joint measurement system are of a size that can be packaged inside the hip joint or ankle joint without compromising performance.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a side elevational view of a crash test dummy.

FIG. 2 is a top plan view of a left arm of the crash test dummy of FIG. 1.

FIG. 3 is a perspective view of a position sensitive detector.

FIG. 4 is a diagrammatic view illustrating a ball center at a constant distance away from the position sensitive detector of FIG. 3 and a change in angle and distance of the position of a light spot.

FIG. 5 is a diagrammatic view of polarizing light with polarizers.

FIG. 6 is a diagrammatic view of medial/lateral rotation measurement using the polarizers of FIG. 4.

FIG. 11 is an exploded view of the ankle joint measurement system of FIG. 8.

DESCRIPTION OF THE PREFERRED EMBODIMENT(S)

Figure 7:
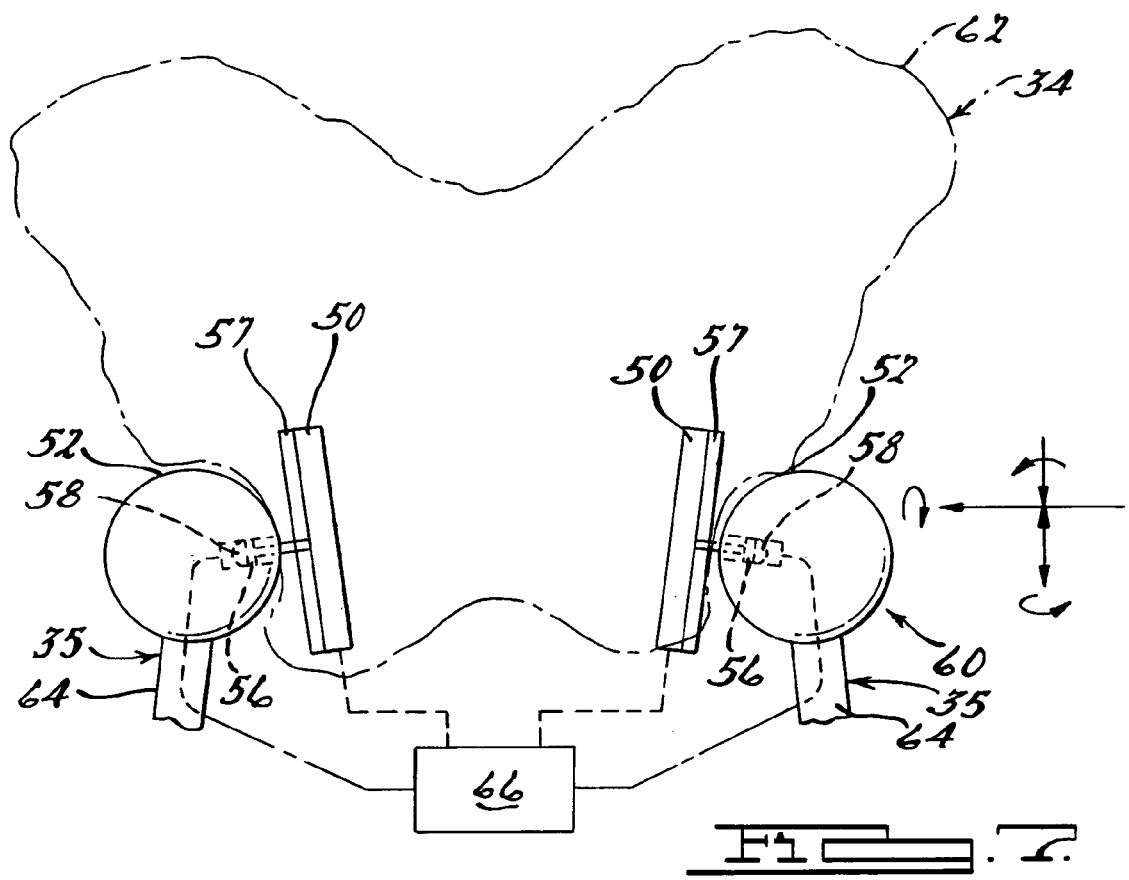
FIG. 7 is a diagrammatic view of a hip joint measurement system, according to the present invention, of the crash test dummy of FIG. 1.
Figure 8:
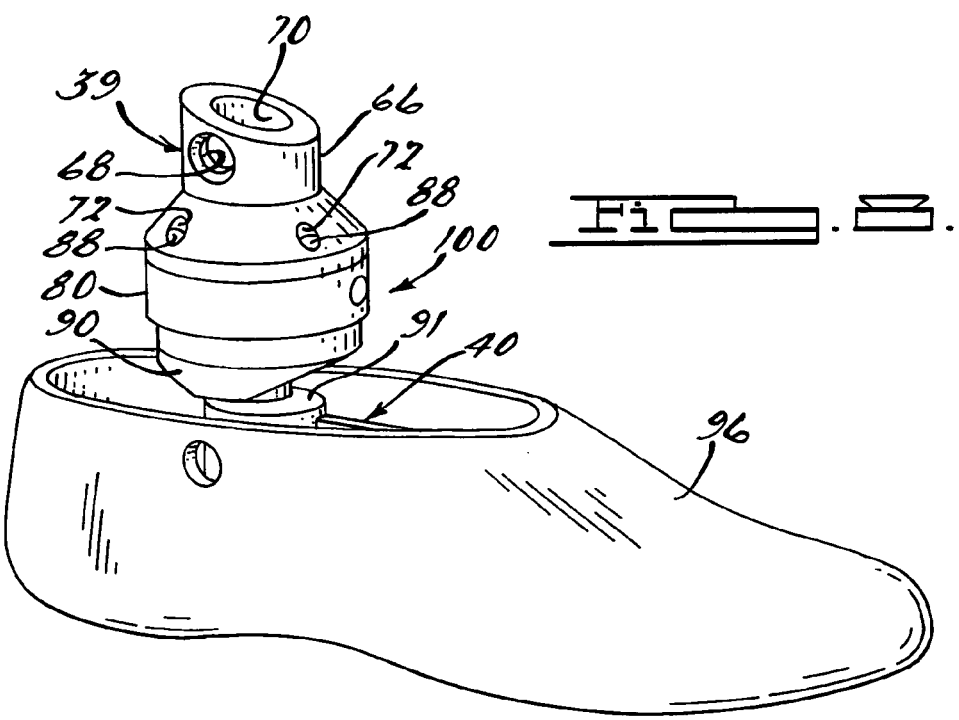
FIG. 8 is a perspective view of an ankle joint measurement system, according to the present invention, of the crash test dummy of FIG. 1.
Figure 9:
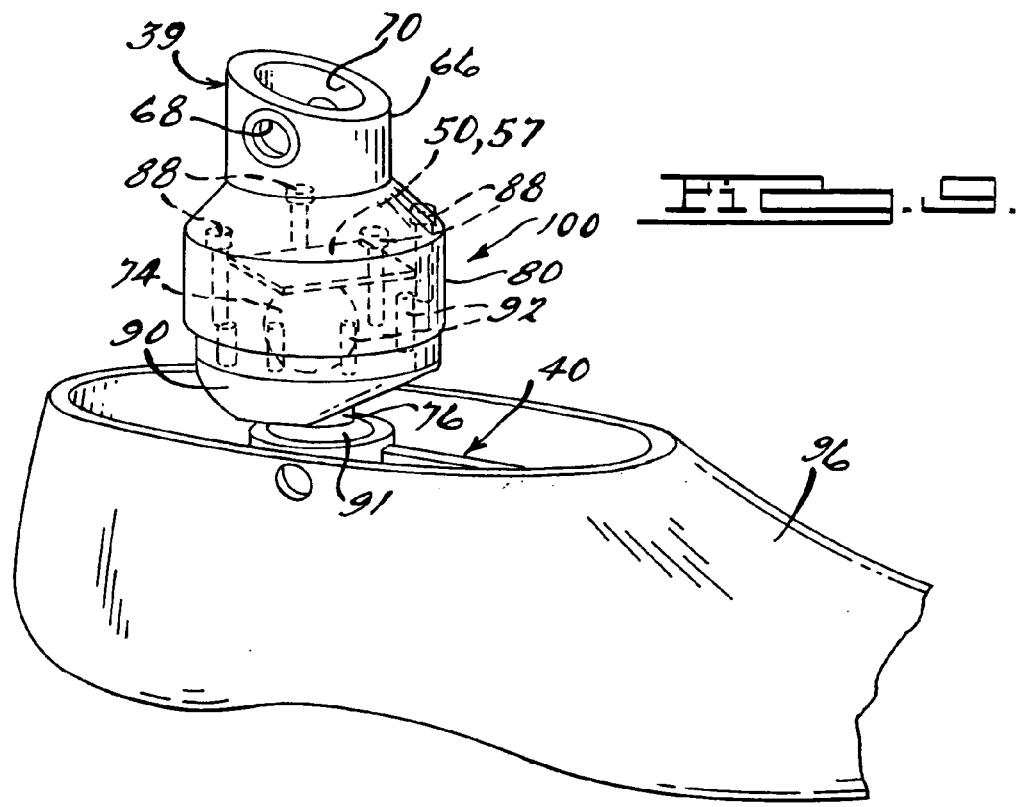
FIG. 9 is a transparent perspective view of the ankle joint measurement system of FIG. 8.
Figure 10:
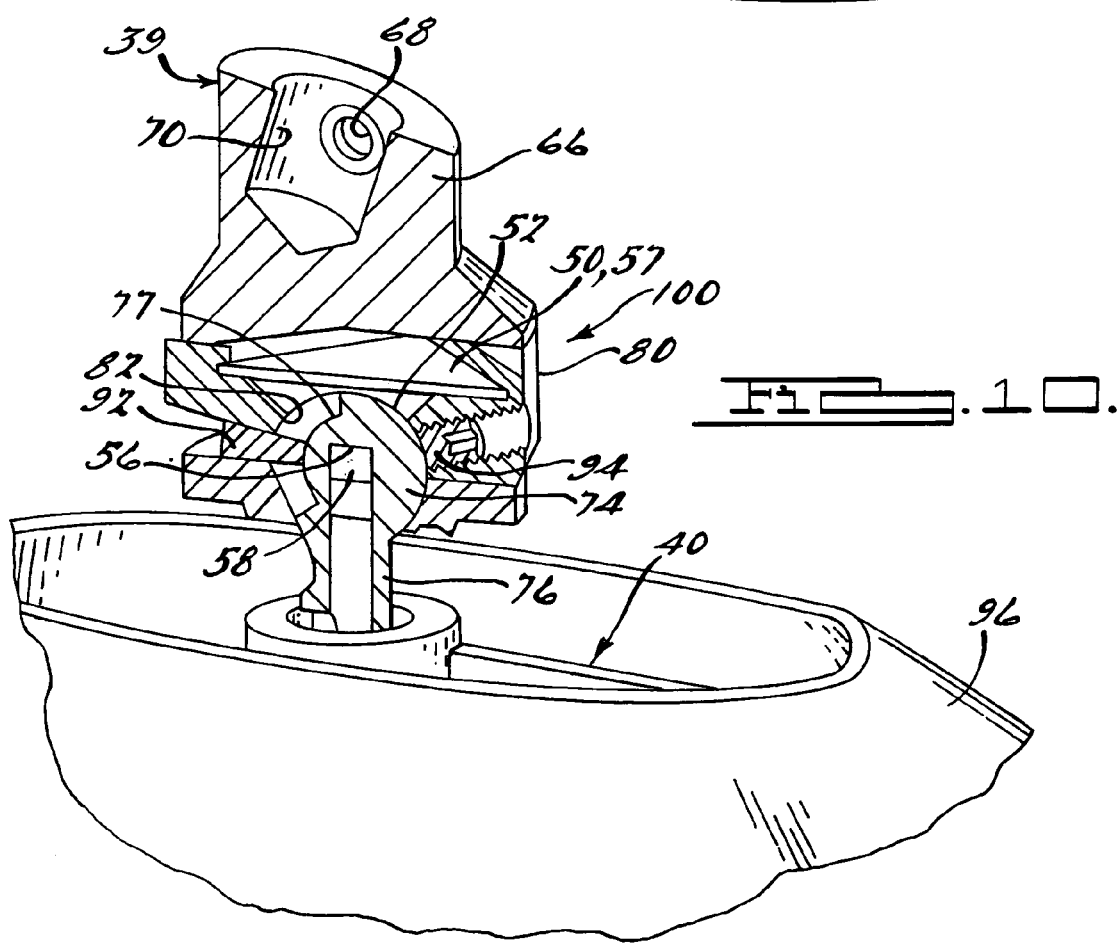
FIG. 10 is a fragmentary perspective view of the ankle joint measurement system of FIG. 8.

Referring to the drawings and in particular FIG. 1, one embodiment of a crash test dummy 11 of a Hybrid III fifth percentile female type is illustrated in a sitting position. This crash test dummy 11 is used primarily to test the performance of automotive interiors and restraint systems for very small adult front and rear seat occupants. The size and weight of the crash test dummy 11 are based on anthropometric studies by the Human Biomechanics and Simulation Standards Committee Task Force of the Society of Automotive Engineers and represent the lower extreme of the USA adult population. It should be appreciated that ranges of motions, centers of gravity, and segment masses simulate those of human subjects defined by the anthropometric data.

The crash test dummy 11 has a head assembly 12, which is shown in cross-section and includes a one-piece cast aluminum skull and one-piece skull cap both covered by a vinyl skin. The skull cap is removable for access to head instrumentation contained inside the head assembly 12. The head assembly 12 is mounted at the top end of a neck assembly 13 by a nodding block 14 and a nodding joint 15. A lower end of the neck assembly 13 extends into a torso area of the crash test dummy 11 and is connected to an upper end of a thoracic spine 16 by an upper neck bracket 17 connected to a lower neck bracket 18. The torso area of the crash test dummy 11 is shown in cross-section to reveal a rib assembly 19 having an upper end connected to the upper neck bracket 17 and a lower end connected to a sternum assembly 20. A rib set 21 has a plurality of ribs connected between the sternum assembly 20 and the thoracic spine 16.

The lower end of the spine 16 is connected to a spine mounting weldment 22 by an adapter assembly 23.

Referring to FIGS. 1 and 2, the crash test dummy 11 also has a pair of arm assemblies including a right arm assembly, which is hidden from view, and a left arm assembly, which has been removed to reveal the interior of the torso. As illustrated in the FIG. 2, a left arm assembly 24 represents both the left and right arms, which are attached to the crash test dummy 11. The arm assembly 24 includes a clavicle link 25, which connects a clavicle 26 to the top of the thoracic spine 16. The clavicle 26 is connected to a shoulder yoke 27, which in turn is connected to an upper end of an upper arm assembly 28. A lower end of the upper arm assembly 28 is connected to an upper end of a lower arm assembly 29. A lower end of the lower arm assembly 29 is connected to a hand assembly 30. It should be appreciated that the right arm assembly is constructed in a similar manner.

As illustrated in the FIG. 1, the spine mounting weldment 22 is connected to an upper end of a lumbar spine 31. A lower end of the lumbar spine 31 is connected to a lumbar-thoracic adapter 32, which is connected to a lumbar to pelvic adapter 33. A pelvis assembly 34 is connected to the adapter 33. A femur assembly 35 for a left leg has one end connected to the pelvis assembly 34. An opposite end of the femur assembly 35 is connected to a thigh bone 36 having an opposite end connected to a sliding knee assembly 37. One end of a tibia 38 is connected to the knee assembly 37 and an opposite end is connected to an ankle assembly 39. The ankle assembly 39 is connected to a foot assembly 40. It should be appreciated that, although only a left leg is shown, a right leg is similar in construction.

The various components of the crash test dummy 11 are covered in a vinyl skin such as the chest flesh and skin assembly 41, which extends from the lower end of the neck assembly 13 to a central portion of the lumbar spine 31. A lower end of the chest flesh and skin assembly 41 partially covers an upper portion of an abdominal insert 42 positioned in the lower torso. A lower portion of the abdominal insert 42 is covered by an upper portion of the pelvis assembly 34. A thigh flesh and skin 43 covers the thigh bone 36 and a lower leg flesh/skin 44 covers the portion of the leg between the knee and the foot. A lifting ring 45 is attached to the head assembly 12 for lifting the crash test dummy 11 into and out of test fixtures and vehicles. The crash test dummy 11 has instrumentation (not shown) at the shoulder, elbow, and wrist of the arm assembly 24, H-point of the pelvis assembly 34, knee assembly 37, and ankle assembly 39. The crash test dummy 11 also has a data acquisition system, connectors, and cables (not shown) communicating with the instrumentation. It should be appreciated that, except for a hip joint measurement system 60 and ankle joint measurement system 100 to be described, the crash test dummy 11 is similar to that disclosed in U.S. Pat. No. 5,741,989, the disclosure of which is hereby incorporated by reference.

Referring to FIG. 3, both the hip joint measurement system 60 and ankle joint measurement system 100 to be described include a position sensitive detector (PSD) 50 used in conjunction with the crash test dummy 11. The PSD 50 is an opto-electronic device, which provides continuous position data of an incident light spot. The position data is independent of the light intensity. The PSD 50 has excellent linearity (<0.3%) and resolution (<0.03%) and a very fast response (rise time<3 $\mu s$).

The PSD 50 consists of three layers: an I layer sandwiched between a P layer and an N layer over a planar silicone substrate. As the light spot hits the surface of the PSD 50, a current proportional to the energy of the light is generated. The N and P layers are designed to function as linear resistors. From this property, equations representing the coordinates of the light spot as functions of electrode currents X1 and X2, and Y1 and Y2 are illustrated in FIG. 3.

Referring to FIG. 4, the PSD 50 can be used to directly output the tangent of the two angles of a ball joint 52. As illustrated in FIG. 4, a center 54 of the ball joint 52 is a constant distance away from the PSD 50. As the angle changes, the distance of the position of the light spot will change according to the tangent of the angle as illustrated in FIG. 4. As a result, the PSD 50 can measure two rotation angles.

Referring to FIG. 5, a third angle of the ball joint 52 can be detected, using two polarizing sheets or first and second polarizers 56 and 57 disposed between a light source 58 and the PSD 50. In one embodiment, the light source 58 is a laser or light emitting diode (LED), the first and second polarizers 56 and 57 are of a linear type, and the PSD 50 is of a two-dimensional type. In one embodiment, in addition to the outputs indicating the coordinates of a light spot on the PSD 50, the PSD 50 provides an output indicating the intensity of the light. Since the light spot is much smaller than the surface of the PSD 50, the overall light power measured by the PSD 50 is constant for a constant intensity of the light source 58 regardless of the incident angle and the distance of the light source 58 away from the PSD 50. As the polarized light passes through the second polarizer 57, the intensity of the light is related to the angle at which the second polarizer 57 is oriented by the square of the cosine of the angle as detailed below.

As light passes through the first and second polarizers 56 and 57, the intensity of light transmitted is dependent on the angle between the transmission axes of the first and second polarizers 56 and 57 as illustrated in FIG. 5. Since the first polarizer 56 produces linearly polarized light oriented parallel to its transmission axis and the second polarizer 57 only allows light oriented parallel to its own transmission axis to pass, total transmission and intensity are at maxima when the angle between the axes of the first and second polarizers 56 and 57 is zero and total transmission and intensity are zero when the axes of the first and second polarizers 56 and 57 are perpendicular. Malus's law states that the intensity of light transmitted is $I = I_o \cos^2 \theta$ where $I_o$ is the intensity of light incident on the second polarizer 57 and $\theta$ is the angle between the transmission axes of the first and second polarizers 56 and 57.

Referring to FIGS. 6 and 7, a hip joint measurement system 60, according to the present invention, is shown for the crash test dummy 11. The hip joint measurement system 60 includes the PSD 50 mounted to a pelvis 62 of the pelvis assembly 34 for each hip joint or ball joint 52. The hip joint measurement system 60 also includes the light source 58 mounted to a femur ball 64 of the femur assembly 35. The hip joint measurement system 60 also includes the first polarizer 56 mounted to the femur ball 64 adjacent one end of the light source 58. The hip joint measurement system 60 also includes the second polarizer 57 mounted to the pelvis 62 adjacent the PSD 50. The hip joint measurement system 60 further includes an electronic control unit 66 electrically connected to the light source 58 to provide power thereto and electrically connected to the PSD 50 to receive information on the angles of the hip joint or ball joint 52. It should be appreciated that the pelvis assembly 34 has an exit for a cable (not shown) for the PSD 50 and the femur assembly 35 has an exit for a cable (not shown) for the light source 58. It should also be appreciated that the angle around the Y-axis is measured utilizing light polarization, which can measure up to 90°, and the angles around the x and z axes are measured directly from the PSD 50. It should be further be appreciated that, in order for the PSD 50 to be calibrated, the PSD 50 is self-contained and removable from the pelvis 62. It should yet further be appreciated that the first and second polarizers 56 and 57 allow medial/lateral rotation of the hip joint or ball joint 52 to be measured by the PSD 50 as illustrated in FIG. 6. It should still further be appreciated that the PSD 50 also measures the other two rotations as previously described.

The ranges of motion of the hip joint or ball joint 52 are shown in the Table 1. Since the hip joint or ball joint 52 has a large femur ball 64 with a diameter of 1.5", the measurement range of the PSD 50 is limited to 40° in medial/lateral and adduction/abduction. However, this limitation does not affect measurement since these angles do not exceed 40° in typical crash tests. In flexion, the range of the PSD 50 is 90° since the first and second polarizers 56 and 57 are used to measure the flexion angle.

TABLE 1

| # | Joint Name | From | To | Method | Comments |
|---|---|---|---|---|---|
| 10 | Hip flexion | −30° | 50° | PSD | Within PSD range |
| 11 | Hip medial/lateral rotation | −20° | 20° | PSD | Joint can rotate 70°. PSD range is 40° * |
| 12 | Hip adduction/ abduction | −20° | 20° | PSD | Joint can rotate 120°, PSD range is 40° * |

Referring to FIGS. 8 through 11, the ankle assembly 39 has an adapter or ankle connector 66 connected to a load cell (not shown) of the tibia 38. The adapter 66 is made of a lightweight material such as aluminum. The adapter 66 has a transverse aperture 68 and a recess 70 formed therein. The recess 70 interrupts a central portion of the aperture 68 for receiving a linking element (not shown), which is retained within the recess 70 by a fastener (not shown), which extends through and threadably engages the aperture 68. The adapter 66 also has a plurality of apertures 72 spaced circumferentially and extending axially therethrough for a function to be described.

The ankle assembly 39 also includes a ball 74 having a stem 76 connected to the foot assembly 40 by suitable means such as a fastener 78. The ball 74 has a groove 77 formed therein, which extends over a portion of its surface, for a function to be described.

The ankle assembly 39 includes a retainer 80 having a complementary socket 82 for receiving the ball 74. The ball 74 and the socket 82 cooperate to form a subtalar joint with a range of motion simulating a human foot-ankle joint. The retainer 80 has a recess 84 for a function to be described. The retainer 80 also has a plurality of apertures 86 spaced about the recess 84 and extending axially therein. The retainer 80 is attached to the adapter 66 by suitable means such as fasteners 88 extending through the apertures 72 in the adapter 66 and threadably engaging the apertures 86 in the retainer 80.

The ankle assembly 39 further includes a cushion or bumper 90 formed of a resilient material such as rubber and disposed about the stem 76 of the ball 74. The bumper 90 has a plurality of pins or dowels 92 extending therefrom to be received in corresponding apertures (not shown) of the retainer 80 to connect the bumper 90 to the retainer 80. The bumper 90 is spaced from a sloped surface 91 of the foot assembly 40. It should be appreciated that the bumper 90 returns the ankle joint to a neutral position after the joint has been moved. It should also be appreciated that the bumper 90 provides the same joint stiffness as that of a standard Hybrid III 50$^{th}$ ankle-foot assembly.

The ankle assembly 39 also includes a fastener such as ball guide screw 92 threadably retained in the retainer 80 and extending into the groove 77 to limit or control a range of rotation of the ball 74 in the socket 82. The ankle assembly 39 further includes a fastener such as a set screw 94 threadably retained in the retainer 80 and contacting the ball 74 to set the ankle joint to a predetermined force, preferably 1-g, to hold it against accidental movement. It should be appreciated that the foot assembly 40 is covered by foot flesh and skin 96.

Referring to FIGS. 8 through 11, an ankle-foot or ankle joint measurement system 100, according to the present invention, is shown for the crash test dummy 11. The ankle joint measurement system 100 includes the PSD 50 mounted to the retainer 80. The PSD sensor 50 is installed in the recess 82 above the ball 74. The ankle joint measurement system 100 also includes the second polarizer 57 disposed adjacent the PSD 50 and adhered to the surface of the PSD 50. The ankle joint measurement system 100 includes the light source 58 inserted inside the ball 74 to provide light for PSD 50. The ankle joint measurement system 100 further includes the first polarizer 56 disposed adjacent to one end or above the light source 58. The ankle joint measurement system 60 includes the electronic control unit 66 electrically connected to the light source 58 to provide power thereto and electrically connected to the PSD 50 to receive information on the angles of the ankle joint or ball joint 52. It should be appreciated that the ankle assembly 39 has an exit for a cable (not shown) for the PSD 50 and the foot assembly 40 has an exit for a cable (not shown) for the light source 58.

In operation, the ankle joint measurement system 100 measures rotation of the ankle joint or ball joint 52. The PSD 50 provides X and Y coordinates of the light spot from the light source 58, and therefore provides foot rotation angles for dorsiflexion/plantar flexion and eversion/inversion. When the foot assembly 40 rotates about Z-axis (medial/lateral rotation), the light intensity on the PSD sensor 50 changes due to the first and second polarizers 56 and 57. The PSD 50 detects this light intensity and provides an output that is proportional to the squared cosine of the rotation angle. Therefore, all three angles are measured by one PSD 50. It should be appreciated that the first and second polarizers 56 and 57 allow medial/lateral rotation of the ankle joint or ball joint 52 to be measured by the PSD 50.

As illustrated in FIG. 11, the ankle joint or ball joint 52 that has three degrees of freedom and can rotate about all three axes The rotations are as follows:

Rotation about Y-axis: Dorsiflexion (45°) and Plantar Flexion (33°) as indicated by arrow 102;

Rotation about X-axis: Eversion (23°) and Inversion (23°) as indicated by the arrow 104; and Rotation about Z-axis: Medial (23°) and Lateral rotation (23°) as indicated by the arrow 106. It should be appreciated that the PSD 50 is installed inside the ankle assembly 39 to measure Dorsiflexion/Plantar flexion and Eversion/Inversion. It should also be appreciated that the medial/lateral rotation is measured through the first and second polarizers 56 and 57.

Accordingly, the present invention has the advantage of being technologically ready because it allows X and Y coordinate measurement within the application range of the PSD 50. The present invention also has the advantage of being accurate because the PSD 50 is a highly linear and accurate sensor. As a result, the overall accuracy of ankle measurement is determined by the accuracy of the mechanical components wherein dowel pins are used to minimize mechanical uncertainty. The present invention has the advantage of high speed because the PSD 50 is an analog sensor with very small rise time. As a result, the overall speed is determined by the data acquisition system. The present invention further has the advantage of a small package size because the ankle assembly 39 and foot assembly 40 are designed to meet weight and performance specifications.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A measurement system for a ball joint of a crash test dummy comprising:
   a light source operatively supported by a movable ball of the ball joint;
   a position sensitive detector operatively supported by a fixed member of the ball joint; and
   a controller electrically connected to said light source to provide power to said light source for emitting light and electrically connected to said position sensitive detector that receives the emitted light to measure at least two angles between the ball and the fixed member.

2. A measurement system as set forth in claim 1 wherein said PSD is of a two-dimensional type.

3. A measurement system as set forth in claim 1 including a first polarizer disposed between said light source and said PSD.

4. A measurement system as set forth in claim 3 including a second polarizer disposed between said first polarizer and said PSD.

5. A measurement system as set forth in claim 4 wherein said first polarizer and said second polarizer are each of a linear type.

6. A measurement system as set forth in claim 1 wherein said light source is either one of a laser and light emitting diode.

7. A hip joint measurement system for a crash test dummy comprising:
   a light source operatively supported by a movable ball of a femur;
   a position sensitive detector operatively supported by a pelvis; and
   a controller electrically connected to said light source to provide power to said light source for emitting light and electrically connected to said position sensitive detector that receives the emitted light to measure at least two angles between the ball and the pelvis.

8. A hip joint measurement system as set forth in claim 7 wherein said PSD is of a two-dimensional type.

9. A hip joint measurement system as set forth in claim 7 including a first polarizer disposed between said light source and said PSD.

10. A hip joint measurement system as set forth in claim 9 including a second polarizer disposed between said first polarizer and said PSD.

11. A hip joint measurement system as set forth in claim 10 wherein said first polarizer and said second polarizer are each of a linear type.

12. A hip joint measurement system as set forth in claim 7 wherein said light source is either one of a laser and light emitting diode.

13. An ankle joint measurement system for a crash test dummy comprising:
    a light source operatively supported by a movable ball of a foot;
    a position sensitive detector operatively supported by an ankle; and
    a controller electrically connected to said light source to provide power to said light source for emitting light and electrically connected to said position sensitive detector that receives the emitted light to measure at least two angles between the ball and the ankle.

14. An ankle joint measurement system as set forth in claim 13 wherein said PSD is of a two-dimensional type.

15. An ankle joint measurement system as set forth in claim 13 including a first polarizer disposed between said light source and said PSD.

16. An ankle joint measurement system as set forth in claim 15 including a second polarizer disposed between said first polarizer and said PSD.

17. An ankle joint measurement system as set forth in claim 16 wherein said first polarizer and said second polarizer are each of a linear type.

18. An ankle joint measurement system as set forth in claim 13 wherein said light source is either one of a laser and light emitting diode.

19. A crash test dummy comprising:
    a pelvis assembly;
    a femur assembly operatively connected to said pelvis assembly;
    an ankle assembly operatively connected to said femur assembly;
    a foot assembly operatively connected to said ankle assembly;
    a hip joint between said femur assembly and said pelvis assembly;
    an ankle joint between said ankle assembly and said foot assembly;
    at least one of said hip joint and said ankle joint being a ball joint;
    a light source operatively supported by a movable ball of said ball joint;
    a position sensitive detector operatively supported by a fixed member of said ball joint; and
    a controller electrically connected to said light source to provide power to said light source for emitting light and electrically connected to said position sensitive detector that receives the emitted light to measure at least two angles between the ball and the fixed member.

20. A crash test dummy as set forth in claim 19 including a first polarizer disposed between said light source and said PSD and a second polarizer disposed between said first polarizer and said PSD.

* * * * *